United States Patent
Tashchyan

(10) Patent No.: US 6,581,321 B2
(45) Date of Patent: *Jun. 24, 2003

(54) JIG AND FISHING SYSTEM

(76) Inventor: Minas Tashchyan, 2172 E. 7180 S., Salt Lake City, UT (US) 84121

( * ) Notice: Subject to any disclaimer, the term of this patent is extended or adjusted under 35 U.S.C. 154(b) by 0 days.

This patent is subject to a terminal disclaimer.

(21) Appl. No.: 09/852,869

(22) Filed: May 10, 2001

(65) Prior Publication Data

US 2001/0017000 A1 Aug. 30, 2001

Related U.S. Application Data

(62) Division of application No. 09/160,925, filed on Sep. 25, 1998, now Pat. No. 6,269,583.

(51) Int. Cl.⁷ .............................................. A01K 85/00
(52) U.S. Cl. .................................... 43/42.45; 43/42.39
(58) Field of Search ............................. 43/42.48, 42.32, 43/42.45, 42.39

(56) References Cited

U.S. PATENT DOCUMENTS

| | | | | | |
|---|---|---|---|---|---|
| 2,124,152 | A | * | 7/1938 | Salm | 43/42.32 |
| 2,314,907 | A | * | 3/1943 | Sweeney | 43/42.48 |
| 2,498,800 | A | * | 2/1950 | Fehely | 43/42.45 |
| 2,578,532 | A | * | 12/1951 | Forsberg | 43/42.48 |
| 2,965,997 | A | * | 12/1960 | Leonard | 43/42.48 |
| 3,676,948 | A | * | 7/1972 | Hill | 43/42.45 |
| 4,164,826 | A | * | 8/1979 | Metzler | 43/42.48 |
| 4,602,452 | A | * | 7/1986 | Reid | 43/42.45 |
| 5,077,930 | A | * | 1/1992 | Berry | 43/42.48 |
| 5,381,623 | A | * | 1/1995 | Crisp | 43/42.48 |

* cited by examiner

*Primary Examiner*—Kurt Rowan
(74) *Attorney, Agent, or Firm*—Todd E. Zenger; Kirton & McConkie

(57) ABSTRACT

The present invention is directed to a novel jig and fishing system. The jig comprises a bulbous, bent-shaped body having one flat side. The jig is constructed of substantially rust-free materials such as copper and brass. The jig may be used with a novel fishing system comprising a durable, substantially flat-membered line receptacle around with heavy weight line is wound in known lengths.

6 Claims, 2 Drawing Sheets

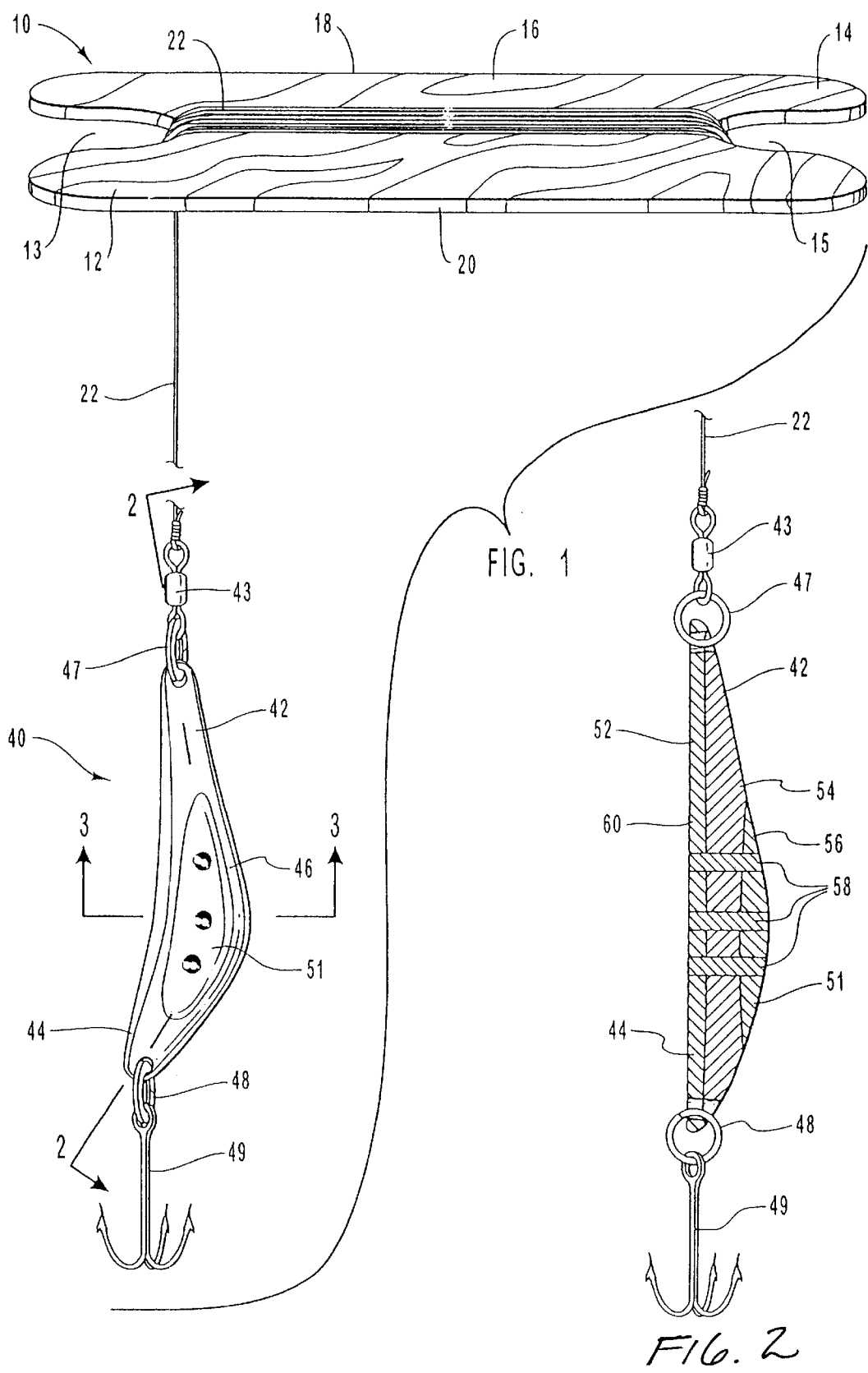

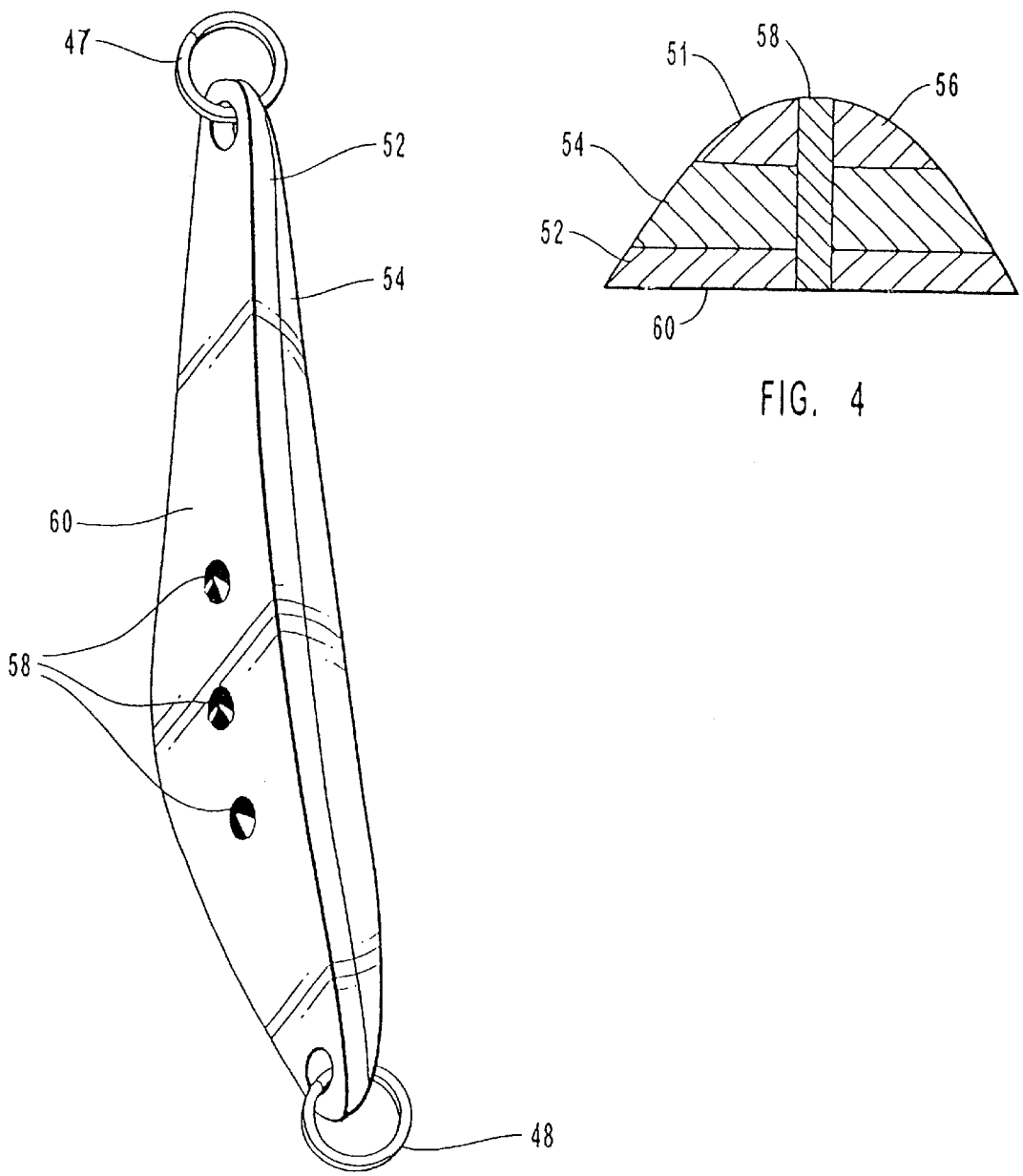

JIG AND FISHING SYSTEM

This is a division of application no. 09/160,925 filed Sep. 25, 1998 now U.S. Pat. No. 6,269,583.

BACKGROUND OF THE INVENTION

1. The Field of the Invention

The present invention is directed to fishing tackle. In particular, the present invention is directed to a unique fishing jig and fishing system which do not require a conventional bendable fishing pole having eyelets and a reel.

2. The Relevant Technology

For hundreds of years fishing equipment has included the use of a pole to which is attached a line. Overtime, difference features of the pole have included it bendability or ability to flex in a direction radial to the axis of the pole. As a result, the length and flexibility of the pole can determine the type of fishing experience. The pole is used to control the line and to signal the strike of a fish. For example, fly-fishing require the use of a long, flexible pole.

Known fishing poles and system employ line of varying test weights. Known fishing system generally discourage the use of line having test weight significantly in excess of the expected catch. Employing known fishing tackle and systems, in order to know the depth of the line, either the line has to be marked or the user is required to employ some type of depth finder.

Known fishing poles have included different mechanisms for keeping the line in association with the pole such as eyelets through which the line passes along the length of the pole. Known fishing poles have also come to include reels of various configurations and functions including casting reels, fly reels, trolling reels, etc. Reels also help to control the release, drag and gathering of the line.

Known fishing systems typically include the use of a pole, line, reel and one or more types of bait, lure, fly, jig or other device to secure fish to the line. Such securing devices typically have two purposes, namely, to attract the fish to bite or strike the securing device and to permit the user to draw the fish to the surface without escaping. Various configurations of securing devices have been designed using various construction materials. Due to the use of light weigh lines, it is inherently part of conventional fishing to need to carry additional securing devices because many are lost due to snags, line breaks or are pulled loose by fish.

The shortfall of the known fishing jigs and fishing systems is the inability to provide a jig and/or system that do not require a pole, reel, or marked line, yet provide the necessary control of the line and indications as to the depth of the line. What is needed is a fishing system that does not require a lengthy pole or a reel to control the line. What is needed is a fishing system that permits the user to readily know the depth of the line without marking the line. What is needed is a fishing system that can be carried in a pocket freeing the users hands for other duties. What is needed is a jig and line weight that do not require frequent changing, but effectively attract and secure fish to the line.

SUMMARY AND OBJECTS OF THE INVENTION

The present invention is directed to a jig and fishing system. More particularly, the jig of the present invention is directed to a jig configured of such a size, weight, shape and color such that in use in simulates a small injured fish. The present invention is also directed to use of the jig with a fishing system that does not require a pole with eyelets or other means to associate the line with the pole to control the line and that does not require the use of a reel. Furthermore, the fishing system of the present invention does permits the user to readily identify the depth of the jig.

The jig of the present invention comprises a body having a length and thickness. The length of the body includes a first end, a midsection, and a second end. Between the first end and the second end the body experiences a bend or curve in the midsection such that the jig has a dog-leg like redirection along its length. That is, the axis of the length comprises a first axis portion and a second axis portion, wherein the axis first portion and second axis portion meet at an obtuse angle between the first end and the second end, preferably at substantially the midsection of the body. In the preferred embodiment, the cross-sectional area of the first end and second end normal to the axis are small than the cross-sectional area of the midsection resulting in the jig being somewhat bulbous in the midsection as compared to the ends. In the preferred embodiment, the resulting jig resembles a perch. In the preferred embodiment, the jig is flattened or substantially flattened on one side along the length.

The jig may be configured with an appearance to simulate a small fish. This can be accomplished by providing a variety of features, shapes or colors. In the preferred embodiment, the jig is a laminate of alternating smooth, polished substantially rust-free materials having different colors such as brass and copper. In the preferred embodiment, layers comprise alternating layers of brass and copper with steel pins to hold the laminate together. Because the cross-sectional area changes along the length of the jig, the laminate construction is revealed in varying patterns along the length of the jig. This give the appearance of stripping. The laminate is held together by rivets or pins passing through the laminate substantially perpendicular to the length of the jig. The pins are also made of a different colored substantially rust-free material and give the appearance of scales.

One end of the jig is configured to receive a hook. The other end of the jig is configured to receive the fishing line. A swivel is preferred between the jig and the line.

The system of the present invention employs the jig described above and further comprises line attached to the jig, and means for receiving, storing, releasing, controlling and readily measuring the length of the line without passing the line through closed eyelets and without necessitating the use of a reel. The means described herein shall be generally called the line receptacle. The line receptacle in configured to have a length, width and thickness such that the distance along the length is greater than the distance along the with. The thickness of the line receptacle is selected for convenience of the user for placing the line receptacle in a pocket or pouch without being excessively bulky. In the preferred embodiment the length of the line receptacle has a first end and a second end. The first end and the second end of the line receptacle define a forked configuration such that line may be wrapped around the line receptacle along its length between the forked ends. Preferably, the lineal distance of the wrap is a desired, known length such as one lineal foot so that the length of the line released may be readily observed. The line receptacle can be constructed of any number of materials such as rust-free or substantially rust-free materials, wood, plastic, pvc, or any other sufficiently rigid, durable material.

In use, the line with its attached jig are wrapped around the forked line receptacle. To release line, the line receptacle is simply rotated end or over end observing the number of rotations until the desired length of line is released. This system is particularly suited to fishing with a jig. Once the desired length of line is released, the user activates the jig by raising and lowering the line receptacle. By raising the line receptacle, the jig is raised. By lowering the line receptacle, the jig is permitted to fall through the water. Due to the configuration of the jig, the jig has the appearance of a small fish and rises and falls in a fluttering fashion, simulating the swimming or floundering of an injured fish. This repeated jigging attracts larger fish. When the larger fish attempt to swallow the jig, the fish is hooked by the attached hooks. Because the system of the present invention is not dependent on the weight of the line for control by a pole or reel, heaving weight lines, up to forty pounds, can be readily use. Use of heavier weight lines ensures landing the fish and prevents line breaks.

It is an object of this invention to provide a jig and/or fishing system that do not require a pole, reel, or marked line, yet provide the necessary control of the line and indications as to the depth of the line.

It is another object of the present invention to a fishing system that does not require a lengthy pole or a reel to control the line.

Still another object of the present invention is to a fishing system that permits the user to readily know the depth of the line without marking the line.

Another object of the present invention is to a fishing system that can be carried in a pocket freeing the users hands for other duties.

A further object of the present invention is to provide a jig and line weight that do not require frequent changing, but effectively attract and secure fish to the line.

Another object of the present invention is to provide a jig whose construction simulate the appearance of a small fish.

An additional object of the present invention is to provide a jig whose movement through water simulates an injured fish.

These objects, and other apparent objective are met employing the invention summarized above and described in detail below.

BRIEF DESCRIPTION OF THE DRAWINGS

In order that the manner in which the above-recited and other advantages and objects of the invention are obtained, a more particular description of the invention briefly depicted above will be rendered by reference to a specific embodiment thereof which is illustrated in the appended drawings. With the understanding that these drawings depict only a typical embodiment of the invention and are not therefore to be considered to be limiting of its scope, the invention will be described and explained with additional specificity and detail through the use of the accompanying drawings in which:

FIG. 1 is a general view of the fishing system of the present invention comprising a line receptacle, line and a novel jig.

FIG. 2 is a cross-section of the jig along line 2—2 of FIG. 1.

FIG. 3 is a perspective view of the jig illustrating a substantially flat side of one embodiment of the jig.

FIG. 4 is a cross-section of the jig along line 3—3 of FIG. 1.

DETAILED DESCRIPTION OF THE PREFERRED EMBODIMENTS

Including by express reference FIGS. 1–3 listed above, the applicant's invention is described as follows. FIG. 1 shows a general view of a fishing system embodying the present invention. The line receptacle is designated generally as receptacle 10. Receptacle 10 comprises a first end 12, a second end 14, and a midsection 16. As shown in FIG. 1, end 12 defines a channel or groove 13. Similarly, end 14 defines a channel or groove 15. Ends 12 and 14 define channels 13 and 15 extending inward from ends 12 and 14 to define opposing channels to received and release line in a wrapped fashion. Receptacle 10 has a length from end 12 to end 14, a width from side 18 to side 20, and a thickness shown as side 20 as desired for weight, strength and convenience for carrying in a pocket or pouch.

In the preferred embodiment the lineal distance between channel 13 and channel 15 is a known, desired length. For example, the lineal distance between channel 13 and channel 15 may be one foot, or some other desired length. When the lineal distance is a known length between channel 13 and channel 15, the user can readily observe the length of line 22 released and determine the depth of jig 40 in the water. As shown in FIG. 1, receptacle 10 is shown as means for receiving, storing, releasing, controlling and readily measuring the length of the line 22 without passing line 22 through any closed eyelets and without necessitating the use of a reel. The line receptacle can be constructed of any number of materials such as rust-free or substantially rust-free materials, wood, plastic, pvc, or any other sufficiently rigid, durable material.

The present invention facilitates the use of heavy line weights, even as high as 50 pound test line. The simple construction of receptacle 10 permits the ready receipt, storage, release and control of such line weights. In order to keep the line from twisting and tangling a heavy duty swivel 43 is employed between jig 40 and line 22. Preferably, swivels used in ocean fishing have been found to be superior because they continue to provide a smooth swivel function with heavier weight lines.

FIG. 2 illustrates the preferred embodiment of jig 40. Jig 40 comprises an proximal, a distal end 44, and a body 46. End 42 is adapted with means 47 to attach jig 40 to line 22. End 44 is adapted with means 48 to attach a hook 49 to jig 40.

Body 46 is configured to have a modest bend or angle along it length giving body 46 a dog-leg type appearance in general. That is, the axis of the length comprises a first axis portion and a second axis portion, wherein the axis first portion and second axis portion meet at an obtuse angle between the first end and the second end, preferably at substantially the midsection of the body. As illustrated in FIG. 2, ends 42 and 44 taper towards the ends and as shown in the combination of FIGS. 2 and 3, ends 42 and 44 have smaller cross-sectional areas than does body 46 about midway along it length. In other words, body 46 is somewhat bulbous about it middle, as shown. In a preferred embodiment, side 60 of body 46 is substantially flat compared to a rounded top 51, see FIGS. 1–4. Experimentation with different embodiments has revealed that having a substantially flat side 60 provides superior floundering action of jig 40 in use and functions optimally in attracting and hooking larger fish.

It is contemplated that body 46 can be made of a variety of materials whether it be plastic, stone, substantially rust-free material, rubber or the like, all materials commonly known in the trade. However, the preferred embodiment is constructed of a variety of substantially rust-free materials which combine to give a striking appearance of a small scaled fish and a superior effect in the water. As shown in FIGS. 1–4, the preferred embodiment of body 46 comprises a plurality of laminate of materials. Three laminate layers are show in FIGS. 1, 2 and 4, as layers 52, 54 and 56. The plurality of layers may comprise alternating materials or different materials. The preferred embodiment comprises a layers 52 and 56 being made of brass and layer 54 being made of copper. This configuration gives a superior brown and gold effect found effective in attracting and hooking fish. It has also been observed that brass and copper discolor slightly and nonuniformly to further simulate shade variations in small fish such as perch.

FIGS. 1–4 illustrate means for holding a plurality of laminate layers together comprises pins 58. Any other rivets, rods, bolts, nails or other similarly functional binding devices are contemplated as providing the same function of holding the laminate layers together. The plurality of layers 52, 54 and 56 could be welded together or other bound together. The binding function of pins 58 is not essential to the practice of the invention. However, in a preferred embodiment, pins 58 are used because they also provided a superior aesthetic function to simulate spots or areas of different color on fish. A similar effect could be achieved by marring top 51 and/or bottom 60. This could be accomplished by actually drilling slight recessed into top 51 and/or bottom 60 to achieve the same effect. In the preferred embodiment, pins 58 are manufactured from steel presenting a silver to black appearance to function hold the plurality of layers together and to function as spots. Because the preferred embodiment comprises copper, brass stainless steel components, jig 40 has a weight which creates an ideal floundering effect in water. The preferred embodiment weighs about 3.5 ounces. Excellent jigs can be configured to weigh from about 3 and to about 4 ounces. Satisfactory jigs may range in weight from about 2 ounces to about 5 ounces. The weight is necessary to act against any current so that the depth of the jig may be determined without introducing linear displacement of the jig caused by current. In other words, unlike the prior art devices, the weight acts to ensure that the jig hangs substantially directly downward from the user. Lighter weight materials may not result in the optimum appearance and/or floundering effect to attract fish or avoid the effects of current which decrease accurate estimates of depth.

Equivalents of the laminate construction of FIGS. 1–4 include construction of body 46 from a single material with layers colors. Similarly, two layers instead of three may be employed, or any number of layered laminates or material. It is also contemplated that pins 58 may not be used at all or made in different shapes or provided in numbers different from those illustrated.

Use of the jig and fishing system disclose herein provide superior, more convenient and simplified tackle for fishing. When constructed, line 22 is wrapped or wound about receptacle 10. Jig 40 is attached to line 22. In use, receptacle 10 is rotated end over end or line 22 is unwound from receptacle 10 to the desired length or depth based upon the known length of line 22 observed to be released from receptacle 10. The present system is most effective when used in a jigging fashion by raising and lower the jig so as to cause it to appear as a floundering fish. This is accomplished by holding the receptacle such that when receptacle 10 it is raised and lowered vertically it effects a jiggling of jig 40 up and down in the water. Such jiggling gives the appearance of a floundering fish, prey for larger fish. Using such a jig when ice fishing has resulted in landing numerous fish when others nearby using conventional systems, lures and baits were unsuccessful. It is believed that the combination of the shiny appearance and the floundering effect are particularly well suited for the conditions associated with ice fishing, including the metabolism and the instinctive feeding habits of fish in colder water.

The fishing system thus presented has advantages over the prior art. The tackle presented is simplified in construction, materials and operation. It provides superior fishing without pole, reel, or marked line while providing line control ready determination as to the depth of the line. The jig and fishing system of the present invention provide fishing tackle which can be carried about in a pocket or pouch freeing the users hands for other activities or duties. The present fishing system provides a jig and line weight that do not require frequent changing, but effectively attract and securely hook fish while diminishing the possibility of broken line. As described above, the present provide a superior simulation of a floundering fish because of the color, shape and action in the water when jigging.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A fishing jig comprising:

a body having a length with a first end having a cross-section, a mid-section having a cross-section, a second end having a cross-section, and an axis of the length, wherein the axis of the length comprises a first axis and a second axis, wherein the first axis and the second axis meet at an obtuse angle to define a dogleg-shaped jig, wherein the cross-section of the first end and the cross-section of the second end are smaller than the cross-section of the midsection, and wherein the jig comprises only two sides, a first being a substantially flat side extending from the first end to the second end and a second bulbous side which tapers toward the first end and the second end.

2. The jig of claim 1 wherein the midsection is substantially bulbous to simulate the appearance of a small fish.

3. The jig of claim 1 wherein the body comprises a plurality of layers providing the appearance of striping.

4. The jig of claim 3 wherein the plurality of layers comprises different colored substantially rust-free materials to provide the appearance of scales.

5. The jig of claim 4 wherein the substantially rust-free materials comprise brass and copper.

6. The jig of claim 1 wherein one end of the jig is configured to receive a hook and wherein the other end of the jig is configured to receive a fishing line.

* * * * *